June 13, 1967  B. P. McDONNELL  3,325,154

MECHANICAL AERATOR

Filed April 15, 1964

Inventor
Bernard P. McDonnell
By Robert B. Benson
Attorney

United States Patent Office 3,325,154
Patented June 13, 1967

3,325,154
MECHANICAL AERATOR
Bernard P. McDonnell, Milwaukee, Wis., assignor to Allis-Chalmers Manufacturing Company, Milwaukee, Wis.
Filed Apr. 15, 1964, Ser. No. 359,994
1 Claim. (Cl. 261—92)

This invention relates generally to mechanical liquid aeration devices of the type in which elements such as disks are alternately dipped into the liquid being treated and then exposed to a gas. More particularly, this invention relates to improvements in mechanical type aerators that operate within pressure vessels.

It has been suggested in the prior art that the efficiency of mechanical aeration devices can be greatly improved if the aerating action takes place in contact with gases under high pressures. For example, in one experiment it was found that the amount of oxygen dissolved in the liquid being treated in a given period of time was increased ten fold when the pressure of the gas being used in the treatment was increased from one atmosphere to ten atmospheres.

This invention is an improvement over the rotating disk type aerating device operating within a pressure vessel and calls for feeding gas under high pressure into the pressure vessel through the liquid being treated. The gas is fed into the vessel at spaced apart points beneath the surface of the liquid being treated and preferably at the bottom or lowest point of the vessel. The gas is fed in at a very slow speed so that it will bubble up slowly through the liquid being treated to obtain maximum absorption of gas directly into the liquid. In so doing, a certain percentage of the gas will be dissolved directly into the liquid being treated in the process of rising to the surface. The remainder of the gas will be trapped in the upper portion of the vessel and is exposed to the thin films of liquid adhering to the surface of the rotating disks. Some of the trapped gas is then absorbed into the liquid films and deposited into the bulk liquid being treated.

Periodically the vessel can be purged of the gas therein and, if desired, a certain amount of the gas in the vessel can be expelled so as to avoid an excessive buildup of pressure within the vessel and permit a continued supply of new gas to the vessel.

Therefore, it is the object of this invention to provide a new and improved mechanical aerating device.

Another object of this invention is to provide a liquid aerating device which is more efficient than those now in use.

Another object of this invention is to provide a liquid aerating device which is more compact than those now in use.

Figure 1:
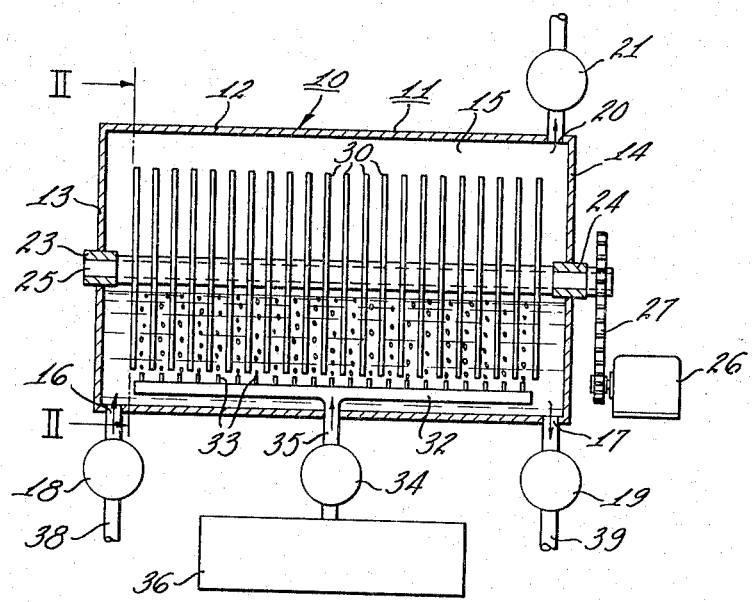
Figure 2:
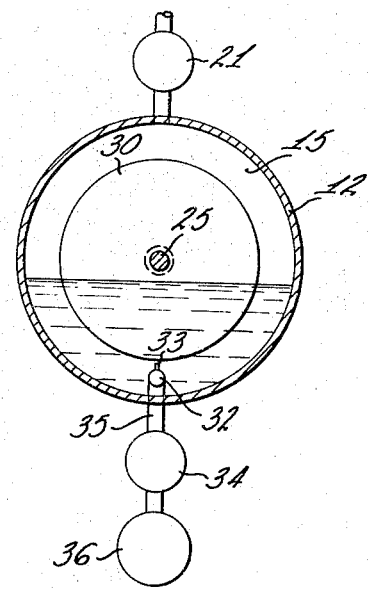

Other objects and advantages of this invention will be apparent from the following description when read in connection with the accompanying drawing in which:

FIG. 1 is a cross section view of an aerating device embodying this invention; and FIG. 2 is a cross section view taken along the line II—II of FIG. 1.

Referring more specifically to the drawing, the invention is illustrated in a disk type, two-phase contactor 10 operating in a high pressure resistant vessel 11. The vessel 11 has a substantially cylindrical shell 12 and a pair of end plates 13, 14 that cooperate with the shell to form an enclosure 15. The vessel 11 has inlet and outlet ports 16 and 17, respectively, for admitting and discharging the bulk liquid to be treated. Appropriate valves 18, 19 are provided for controlling the flow of liquid through the vessel and maintaining the liquid level in the vessel near the center line.

The vessel also has a port means 20 near the top of the shell for discharging gas from the enclosure. A valve 21 is associated with this port means 20 to keep the gas pressure inside the shell at a predetermined level. This valve 21 and port 20 also provide a means for purging or relieving of the gas pressure within the shell when desired.

Suitable bearings 23, 24 are mounted in the end plates 13, 14, respectively. A shaft 25 is rotatably mounted in the bearings and is connected to and rotated by a suitable drive unit such as the illustrated motor 26 and chain drive 27.

A plurality of wettable members illustrated as disks 30 are located inside the vessel 11 and are mounted at axially spaced intervals on the shaft 25 for rotation therewith. The exact shape of the wettable members is not critical to this invention, but they are located in such a way that approximately one-half of their surface is always submerged in the liquid being treated. As the disks 30 rotate, they pick up and expose to the gas a thin film of liquid. The film absorbs gas in the gas phase and deposits it into the bulk liquid when the film is washed off the disk as it moves through the liquid being treated.

Along the bottom of the shell is positioned diffuser 32 for delivering gas to the vessel. Any gas could be used depending on the treatment contemplated. However, in most installations for purifying polluted water, oxygen or air is used. The gas diffuser 32 has a plurality of axially spaced openings or nozzles 33 for admitting gas into the vessel. A valve 34 is provided in conduit 35 leading to the diffuser for controlling the pressure and the amount of gas admitted into the diffuser from the supply tank 36. Gas is admitted to the diffuser in very small quantities at a slow rate but at a slightly higher pressure than the pressure of the gas in the top of the vessel. Hence, the gas emerging from the nozzles 33 bubbles slowly from the bottom of the vessel through the bulk liquid to the gas space at the top of the vessel. Preferably the nozzles 33 in the diffuser 32 are positioned or aligned intermediate the disks so that the gas bubbles, as they rise to the surface of the liquid, do not contact the surface of the disks. A portion of the gas bubbling through the liquid is absorbed thereby enriching the liquid. The gas absorbed into the liquid in this way together with the gas which is absorbed on the film clinging to the disks and deposited in the bulk liquid provide a large volume of gas absorption into the liquid than a similar unit of the same size without the bubbling gas. Hence, the aerator of this invention is more efficient than those known in the prior art.

In operation, the liquid to be treated is fed into the vessel 11 through conduit 38 and inlet 16. Valve 18 is set to control the volume of liquid entering the vessel. The bulk liquid flows through the vessel and is discharged through the outlet 17 and conduit 39. The valve 19 controls the volume of liquid discharged and aids in maintaining the desired liquid level in the vessel. Preferably the liquid level in the vessel is maintained just below the shaft. Gas is slowly fed from tank 36 through the conduit 35 into the diffuser 32 and, hence, into the bulk liquid in the vessel. The gas bubbles slowly upward through the bulk liquid and is trapped in the space above the liquid. The valve 34 is adjusted to control the amount of gas delivered to the diffuser.

As the disks 30 rotate through the liquid they pick up a thin film of liquid on their surface. As this film moves through the gas in the upper portion of the vessel some of the gas is absorbed into the film. This gas absorbed in the film is then deposited into the bulk liquid as the disk rotates therethrough and the film is washed off the disk.

Occasionally it may be desirable to purge the gas in the vessel. This is accomplished by closing all of the valves 18, 19 and 34 and then opening valve 21. When the gas in the space above the liquid is removed, valve 21 is closed and valves 18, 19 and 34 are opened and balanced as described above.

Although but one embodiment of this invention has been illustrated and described, it will be apparent to those skilled in the art that various changes and modifications can be made therein without departing from the spirit of the invention or from the scope of the appended claim.

Having now particularly described and ascertained the nature of my said invention and the manner in which it is to be performed, I declare that what I claim is:

A liquid treating device comprising a closed pressure resistant vessel having an inlet port for admitting said liquid to be treated to the lower portion of said vessel and an outlet port for discharging said liquid therefrom; a shaft rotatably mounted in said vessel about a horizontal axis; a plurality of disks mounted in vertical planes at axially spaced intervals on said shaft for rotation therewith and being partially immersed in said liquid; a diffuser immersed in said liquid in the lower portion of said vessel and having a plurality of gas outlet openings spaced apart in a direction parallel to the axis of said shaft and positioned intermediate said disks; said vessel having a gas discharge opening in the upper portion thereof; valve means associated with said gas discharge opening for maintaining said gas above said liquid in the upper portion of said shell at a predetermined pressure above several atmospheres; means including an inlet valve for supplying gas to said diffuser under a pressure which is slightly higher than said predetermined pressure so that said gas bubbles up through said liquid to said upper portion of said vessel above said liquid; the nonimmersed portions of said disks being exposed to said gas under pressure in said upper portion of said vessel; and means for rotating said shaft at a sufficiently slow velocity so that said disks pick up a coating of said liquid and expose said coating to said gas under pressure in said upper portion of said vessel to absorb some of said gas and return said coating with absorbed gas to said liquid while at the same time said liquid is absorbing some of the gas bubbling therethrough.

References Cited
UNITED STATES PATENTS

| | | | |
|---|---|---|---|
| 363,173 | 5/1887 | Schenck | 261—93 X |
| 1,253,401 | 1/1918 | Lorimer | 261—92 |
| 1,737,624 | 12/1929 | Thomson | 261—93 |
| 2,698,287 | 12/1954 | Bowden et al. | 261—92 X |
| 3,211,148 | 10/1965 | Galajda | 261—92 X |

FOREIGN PATENTS 676,270   5/1939   Germany.

HARRY B. THORNTON, *Primary Examiner.*

E. H. RENNER, *Assistant Examiner.*